United States Patent [19]

Haendle et al.

[11] Patent Number: 5,091,925
[45] Date of Patent: Feb. 25, 1992

[54] X-RAY DIAGNOSTICS INSTALLATION WITH SPATIAL FREQUENCY FILTERING

[75] Inventors: Joerg Haendle; Paul Marhoff, both of Erlangen, Fed. Rep. of Germany

[73] Assignee: Siemens Aktiengesellschaft, Munich, Fed. Rep. of Germany

[21] Appl. No.: 605,111

[22] Filed: Oct. 26, 1990

[30] Foreign Application Priority Data

Jan. 18, 1990 [EP] European Pat. Off. ........ 90101023.1

[51] Int. Cl.$^5$ ............................................. H05G 1/64
[52] U.S. Cl. .................................... 378/99; 378/44; 378/55; 378/901; 358/105; 358/111; 358/138; 358/167
[58] Field of Search ............ 378/99, 901, 57, 55, 378/4, 44; 358/111, 138, 105, 141, 167, 36

[56] References Cited

U.S. PATENT DOCUMENTS

| 4,677,478 | 6/1987 | Kruger et al. | 358/111 |
| 4,745,458 | 5/1988 | Hirano et al. | 358/105 |
| 4,845,561 | 7/1989 | Doyle et al. | 358/141 |
| 4,847,909 | 7/1989 | Shibata | 358/111 |
| 4,860,104 | 8/1989 | Katsuyama | 358/167 |
| 4,873,573 | 10/1989 | Thomas et al. | 358/138 |
| 4,939,758 | 7/1990 | Nowak | 378/99 |
| 4,941,169 | 7/1990 | Kawai et al. | 378/99 |
| 4,985,767 | 1/1991 | Haghiri et al. | 358/138 |
| 5,025,316 | 6/1991 | Darby | 358/105 |

FOREIGN PATENT DOCUMENTS 3007620 9/1981 Fed. Rep. of Germany.
1128852 10/1968 United Kingdom.

Primary Examiner—Janice A. Howell
Assistant Examiner—Kim-Kwok Chu
Attorney, Agent, or Firm—Hill, Van Santen, Steadman & Simpson

[57] ABSTRACT

An x-ray diagnostics installation has an x-ray tube and an image processing and display system which includes a video camera connected to the x-ray image intensifier, an image memory, a spatial frequency filter and a monitor. A motion detector is connected to the image memory and to the video camera and controls operation of the spatial frequency filter to vary the filter effect so that the filter effect is greater in transillumination image regions having little motion than in regions having a higher amount of motion.

6 Claims, 2 Drawing Sheets

X-RAY DIAGNOSTICS INSTALLATION WITH SPATIAL FREQUENCY FILTERING

BACKGROUND OF THE INVENTION

1. Field of the Invention

The present invention is directed to an x-ray diagnostics installation including a spatial frequency filter in the image processing system.

2. Description of the Prior Art

X-ray diagnostics installations are known which include an x-ray tube and an image pick-up and playback system which includes an image memory, a spatial frequency filter and a monitor. Such x-ray diagnostics installations achieve an intensification of the fine or detail contrast of x-ray images. A video system for use in such a system for x-ray fluoroscopy is disclosed in German Patent 1 224 352. In this known system, a video high-pass filter, which contains an image pick-up tube as a memory, is connected in the transmission channel. Large-area contrast regions are thereby attenuated, whereas the high-frequency signal components, which represent the detail contrasts, are amplified. The ongoing video signal is subtracted in two subsequent differential stages from the filtered signal and the difference signal respectively, and the degree of intensification is set by a controllable amplifier. An intensification of the detail contrasts in this known installation is not possible during the generation of fluoroscopic images because the quantum noise is amplified together with the useful signal, the detail contrast signal, so that it has a negative influence in the image observation, even though the signal-to-noise ratio is not changed. In this known device, therefore, in the fluoroscopic mode the spatial frequency filter, which is a spatial high-pass filter, is therefore partially disconnected, or set to operate only at a very weak level.

Another installation is described in German Patent 30 07 620 which, for fluoroscopy includes a motion detector which effects an increase in the dose rate and a reduction in the integration time dependent on the amount of motion.

SUMMARY OF THE INVENTION

It is an object of the present invention to provide an x-ray diagnostics installation in which the image processing system includes a spatial frequency filter, and which permits the spatial frequency filter, particularly a spatial high-pass filter, to be operated during moving scenes or images in the fluoroscopic mode.

The above object is achieved in accordance with the principles of the present invention in an x-ray diagnostics installation having a motion detector connected to the image memory and to the video camera, and which controls a variable spatial frequency filter so that the filter effect of the filter is greater in fluoroscopic scenes having little motion than in scenes having larger motion. The spatial high-pass filter filters the signal substantially completely given fluoroscopic scenes with little motion, so that a maximum boost in detail contrast ensues. If larger amounts of motion occur in the fluoroscopic scene, the effect of the spatial frequency filter is reduced, so that the quantum noise is also reduced.

Preferably the spatial frequency filter is a spatial frequency high-pass filter. The quantum noise is further reduced if the spatial frequency filter is followed by a temporal low-pass filter, with the motion detector preferably controlling the filter effect of the low-pass filter so that it has a greater filter effect in fluoroscopic scenes without motion than in regions having motion of the examination subject. A simple structure is achieved in an embodiment wherein the variable spatial frequency filter is followed by a mixing stage, having a second input to which the current video signal is supplied, with the motion detector controlling the mixing ratio of the mixing stage. An alternative embodiment is to connect the variable spatial frequency filter to an amplifier stage having a variable gain, which is followed by a mixer stage having a second input to which the current video signal is supplied, with the motion detector controlling the gain of the amplifier stage. A storage tube system can be used as the spatial frequency filter which provides a simple, analog solution. The storage tube system may, for example, be a TRANSICON.

DESCRIPTION OF THE PREFERRED EMBODIMENTS

Figure 1:
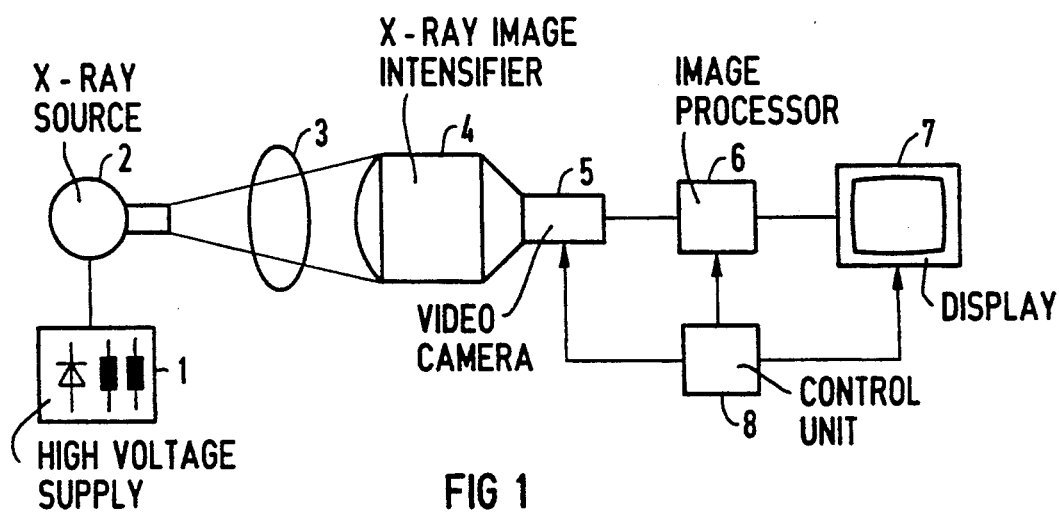
FIG. 1 is a schematic block diagram of a conventional x-ray diagnostics installation in which the processing circuit of FIG. 2 can be used.

A typical x-ray diagnostics installation as shown in FIG. 1, which includes an x-ray tube 2 supplied by a high voltage supply 1. The x-ray tube 2 generates an x-ray beam in which a patient 3 is situated. X-rays attenuated by the examination subject 3 are incident on the input luminescent screen of an x-ray image intensifier 4. A video camera 5 includes a video pick-up tube optically coupled to the output luminescent screen of the x-ray image intensifier 4. The output of the video camera 5 is supplied to an image processor 6, which generates an image of the examination region for display on a monitor 7. A control unit 8 synchronizes the chronological execution of the functions of the video camera 5, the image processor 6 and the monitor 7.

Figure 2:
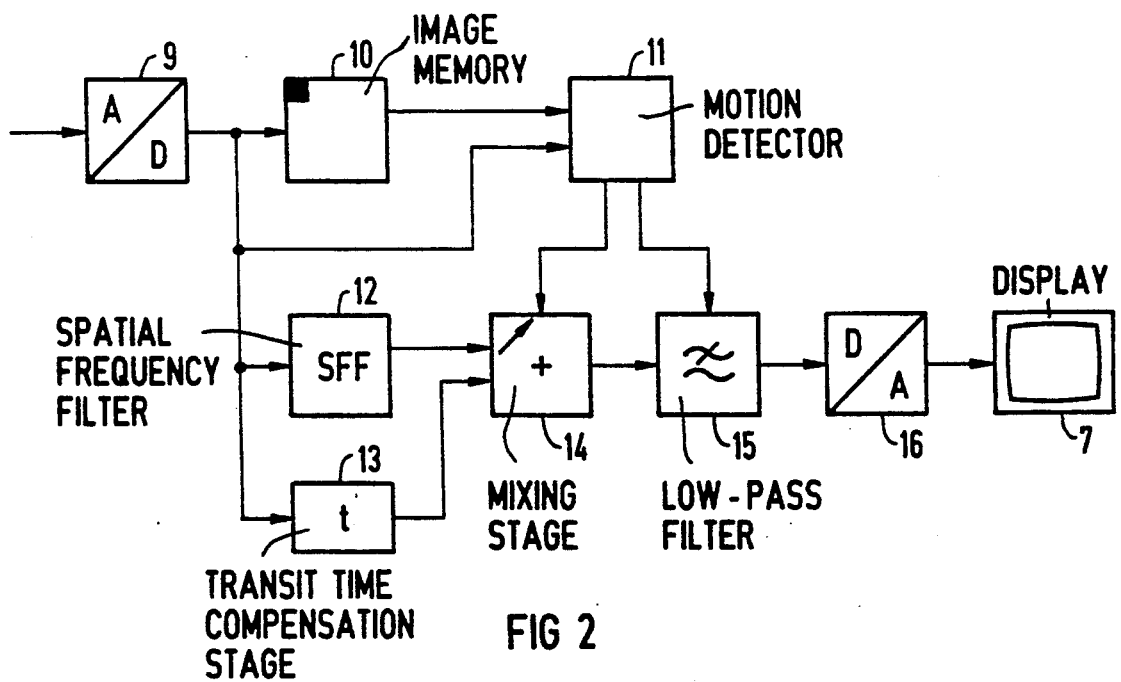
FIG. 2 is a schematic block diagram of an image processing circuit constructed in accordance with the principles of the present invention, which can be used in the diagnostics installation shown in FIG. 1.

A processing circuit constructed in accordance with the principles of the present invention, suitable for use as the image processor 6 in the installation shown in FIG. 1, is shown in a first embodiment in FIG. 2. As an input stage, the circuit includes an analog-to-digital converter 9 to which the analog output signal of the video camera 5 is supplied. The digitized video signal is entered for storage in an image memory 10, having an output connected to a motion detector 11. The output of the analog-to-digital converter 9 is also directly supplied to a second input of the motion detector 11. By comparing the stored video signal and a current video signal, the motion detector 11 recognizes differences in the video signals, and it is assumed that these differences are attributable to motion of the examination subject. The motion detector 11 generates output signals which are dependent on the degree of the motion.

The current video signal from the output of the analog-to-digital converter 9 is also supplied to a variable spatial frequency filter stage, which includes a spatial frequency filter 12, a transit time compensation stage 13, and a mixing stage 14 for the two output signals from the filter 12 and the compensation stage 13. The spatial frequency filter 12 effects a one-dimesional or two-dimensional spatial frequency filtering with corresponding line or image storage. If a detail enhancement is to be undertaken, the spatial frequency filter stage functions as a high-pass filter. If, by contrast, quantum noise is to be suppressed, the spatial frequency filter stage functions as a low-pass filter.

The compensation stage 13 compensates for the transit times which occur in the filter 12, so that signals corresponding chronologically to each other, one of which has been filtered and one of which has not been filtered, are supplied to the mixing stage 14. The mixing stage 14 has a variable mixing degree or mixing ratio. The mixing ratio of the mixing stage 14 is set by the output signal from the motion detector 11. If the video signal stored in the image memory 10 and the current video signal are substantially identical, the motion detector 11 does not supply an output signal, so that a large part of the video signal filtered by the filter 12 is reproduced on the monitor 7. If the motion detector 11 recognizes large differences between the stored and current video signals, the output signal of the motion detector 11 effects a reduction in the part of the filtered video signal. In general, the greater the degree of motion which occurs in the fluoroscopic scene, the greater the reduction in the effect of the spatial frequency filter.

A temporal, recursive low-pass filter 15 is connected to the output of the mixing stage 14, the degree of filtration by the filter 15 also being controlled by the motion detector 11. Control of the low-pass filter 15 is similar to that of the spatial frequency filter stage in that when little or no motion is present in the fluoroscopic scenes the filter 15 has the greatest filtering effect, and the filtering effect of the filter 15 is reduced when a large degree of motion is present in the fluoroscopic scene.

The output signal of the low-pass filter 15 is converted via a digital-to-analog converter 16 into an analog video signal, which is reproduced on the monitor 7.

Figure 3:
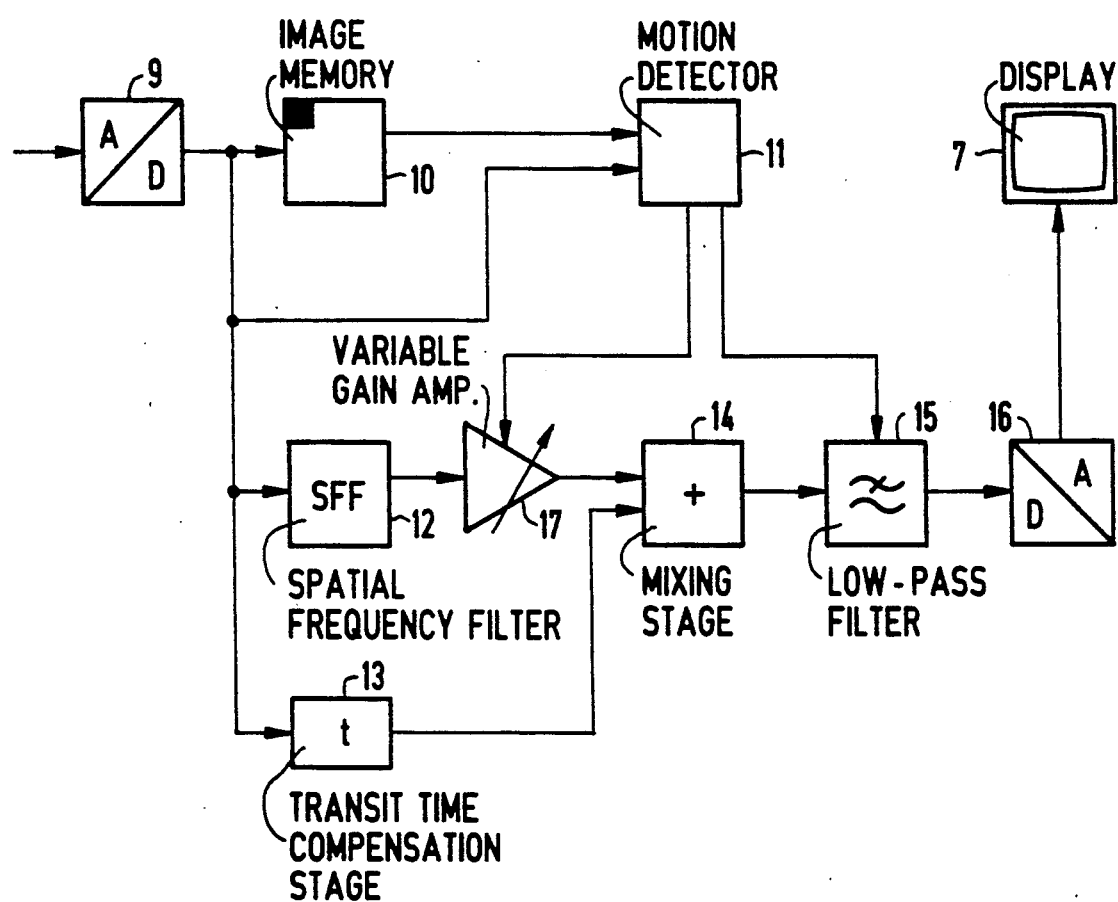
FIG. 3 is a schematic block diagram of a further embodiment of an image processing circuit constructed in accordance with the principles of the present invention.

A further embodiment is shown in FIG. 3 wherein all components identical to the embodiment of FIG. 2 have been provided with the same reference symbols. In the embodiment of FIG. 3, instead of the motion detector 11 controlling the mixing ratio of the mixing stage 14, a variable gain amplifier 17 is provided to which the output of the spatial frequency filter 12 is supplied. The motion detector 11 controls the gain of the amplifier 17, the output of which is supplied to the mixing stage 14. Again, the spatial frequency filter stage, including the variable gain amplifier 17, is controlled so that the largest filtering effect is provided when little motion is present in the fluoroscopic scenes, and only a slight filter effect is achieved when a larger degree of motion is present.

A substantial enhancement in the image quality is achieved by the combination of the temporal and spatial filtering and the control thereof by the motion detector 11 in the image regions without motion, or in images having resting phases, for example, during cardiac cycles in cardiography.

An analog filter circuit, for example, a TRANSICON, may be used instead of the digital filter 12. A further alternative is to conduct the recursive, temporal filtration in, or in combination with, the image memory 10.

In addition to simply influencing the mixing degree (or amplification) of the output of the spatial filter 12, the frequency parameters of the spatial filtering may be influenced by the motion detector 11. For example, in image locations having subject motion, filtering can be undertaken with a lower spatial frequency than in image regions without motion, at which a higher spatial frequency may be more beneficial.

The filter effect may be controlled so that the filter effect for the entire image is varied given the occurrence of motion. Control of the filters 12 and 15, however, may also ensue in individual image regions, so that image regions having a large motion have a lower filter effect and maximum filtration ensuring in the surrounding regions having little motion.

Although modifications and changes may be suggested by those skilled in the art, it is the intention of the inventors to embody within the patent warranted hereon all changes and modifications as reasonably and properly come within the scope of their contribution to the art.

We claim as our invention:

1. An x-ray diagnositics installation comprising:
   an x-ray tube which generates an x-ray beam for penetrating an examination subject disposed in the x-ray beam;
   means for detecting an image consisting of x-rays attenuated by the examination subject; and
   video image processing means for converting said x-ray image into video signals forming a video image, said video image processing means including means for spatial frequency high-pass filtering and means for detecting motion in said video image, said means for detecting motion generating a signal dependent on the degree of motion and being connected to said means for spatial frequency high-pass filtering for varying the high-pass filter effect so that said high-pass filter effect is greater for video images having little motion than for video images having greater motion.

2. An x-ray diagnostics installation as claimed in claim 1 wherein said video image processing means further includes a temporal low-pass filter connected to an output of said means for spatial frequency high-pass filtering.

3. An x-ray diagnostics installation as claimed in claim 2 wherein said motion detector is connected to said temporal low-pass filter for controlling the filter effect of said temporal low-pass filter so that said temporal low-pass filter has a greater filter effect for video images with little motion than for video images having a greater motion.

4. An x-ray diagnostics installation as claimed in claim 1 wherein said spatial frequency high-pass filter means comprises a filter circuit having an output connected to a mixing stage having a second input to which said video signals are supplied without filtering, said mixing stage having a variable mixing ratio controlled by said output signal of said means for detecting motion.

5. An x-ray diagnostics installation as claimed in claim 1 wherein said means for spatial frequency high-pass filtering comprises a filter circuit having an output connected to a variable gain amplifier, and a mixing stage to which an output of said variable gain amplifier is supplied and to which said video signals are also supplied without filtering, said output signal of said means for detecting motion controlling the gain of said variable gain amplifier.

6. An x-ray diagnostics installation as claimed in claim 1 wherein said means for spatial frequency high-pass filtering includes a spatial frequency high-pass filter which is a storage tube system.

* * * * *